April 4, 1933. W. ALBRIGHT 1,903,414
RACE TRACK STARTER BARRIER GATE AND STALL
Original Filed July 2, 1929
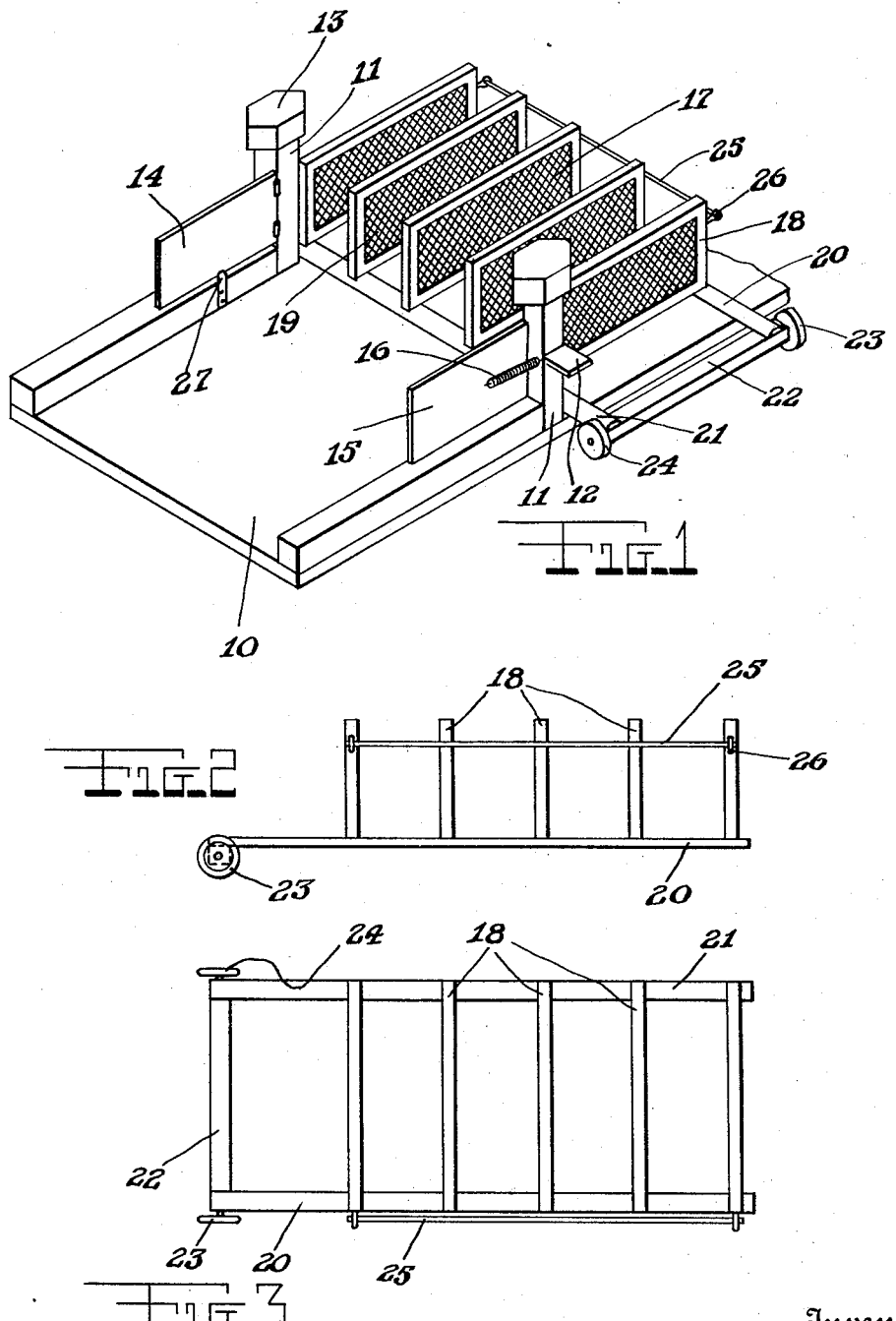

Patented Apr. 4, 1933

1,903,414

UNITED STATES PATENT OFFICE

WILLIAM ALBRIGHT, OF NEW YORK, N. Y.; IDA ALBRIGHT ADMINISTRATRIX OF SAID WILLIAM ALBRIGHT, DECEASED

RACE TRACK STARTER BARRIER GATE AND STALL

Application filed July 2, 1929, Serial No. 375,511. Renewed February 28, 1933.

The main object of this invention is to provide a starting barrier which groups a number of horses side by side in protected position so that one will not injure the other. The device is provided with a mobile carriage on which a plurality of stall panels are mounted in side by side relation to each other. This carriage immediately preceding a race is wheeled across the race track directly behind the starting posts and the horses are entered between the panels and secured from behind so that they cannot bolt backwards, said horses being prevented from starting prematurely by gates which span the track in front of the carriage and are sprung at the desired time.

The above and other objects will become apparent in the description below in which characters of reference refer to like-named parts in the drawing.

Referring briefly to the drawing, Figure 1 is a perspective view of the entire starting barrier showing the gates in closed position and the stall carriage in position to receive the horses.

Figure 2 is a side elevational view of the starting carriage as used with the barrier.

Figure 3 is a top plan view of Figure 2 showing the parallel arranged stall panels.

Referring in detail to the drawing, the numeral 10 indicates a platform surface level with the race track. The track at the starting position is preferably raised above the surrounding terrain in order to form a support for the stall carriage which latter will be hereinafter detailed. On opposing sides of the track starting posts 11 are erected, and on one of these posts is provided a ledge 12, on which the race starter stands. The posts are surmounted by flat surfaced heads 13 upon which flower urns may be placed. To one corner of the posts 11, gates 14 and 15 are attached. Said gates swing on hinges and are adapted to be latched in closed position by means not shown in the drawing. These gates are quickly opened by springs 16, which latter are connected to the posts and the gates, when the latching means are released.

The horses are retained in orderly position side by side behind the gates in parallel arranged stalls 17 located behind the starting line. The stalls are provided by forming spaced apart, upright panels 18 across the width of the raised track. The panels 18 consist of rectangular frames which are provided with a facing of wire mesh 19 or other suitable material which will not injure the legs of the horse. A wheeled carriage having a pair of spaced apart body-rails 20 and 21, upon which the stall panels are mounted, is provided. These rails are joined and held in parallel relation by a cross beam 22, on the ends of which wheels 23 and 24 are mounted. The end of the carriage opposite to the wheeled end is adapted to be lifted above the ground by a hydraulic jack or other similar means, and the carriage then towed by a motor truck.

Preparatory to the start of the race, the gates 14 and 15 are latched in closed position and the carriage is wheeled across the track 10 behind the gates. After the horses are led into the stalls 17, the bar 25 closes the open stalls by engaging the eyelets 26 attached to the end frame 18. Upon a given signal, the gates 14 and 15 are released, and the springs 16 swing the same to open position, and are retained in open position by the resilient fingers 27. The race has then begun. It is of the utmost importance that the stall carriage be quickly removed, so that the racers, on returning will not meet any obstruction and may pass the starting line without hindrance. This is accomplished by wheeling the stall carriage away from the track and upon the field.

It is to be noted, that certain changes in form and construction may be made without departing from the spirit and scope of the invention.

I claim:

A starting barrier comprising starting posts, normally closed gates hingedly mounted on said posts, springs secured to said posts and said gates, and a wheeled stall carriage removably positioned behind said starting posts and gates, said carriage comprising a body wheeled at one end and a plurality of spaced apart upright panels mounted on said body, said panels being surfaced by a non-injuring wire mesh.

In testimony whereof I affix my signature.

WILLIAM ALBRIGHT.